Aug. 5, 1947.    T. SHERIDAN    2,425,049
COMBINATION PLANT STAKE AND LOCK
Filed Aug. 23, 1944

INVENTOR:
Terence Sheridan
BY:—
his Atty's.

Patented Aug. 5, 1947

2,425,049

UNITED STATES PATENT OFFICE 2,425,049

COMBINATION PLANT STAKE AND LOCK

Terence Sheridan, Hamiota, Manitoba, Canada

Application August 23, 1944, Serial No. 550,717

1 Claim. (Cl. 47—44)

My invention relates to a combination plant stake and lock by means of which plants, including the stalks of growing flowers may conveniently be supported in such a way that limited movement is permissible, but not sufficient to bruise or damage the plant or flower stem.

A further object of my invention is to provide a device of the character herewithin described by means of which a large number of plants may very rapidly be supported and with a minimum of labour connected therewith.

A further object of my invention is to provide a device of the character herewithin described which may readily be detached from the plants when it is desired to do so, and which may be used year after year for the purpose herein set forth.

With the above more important objects in view and such other minor objects as may appear as the specification proceeds, my invention consists essentially in the arrangement and construction of parts all as hereinafter more particularly described, reference being had to the accompanying drawings, in which.

In the drawings like characters of reference indicate corresponding parts in the different figures.

Figure 2:
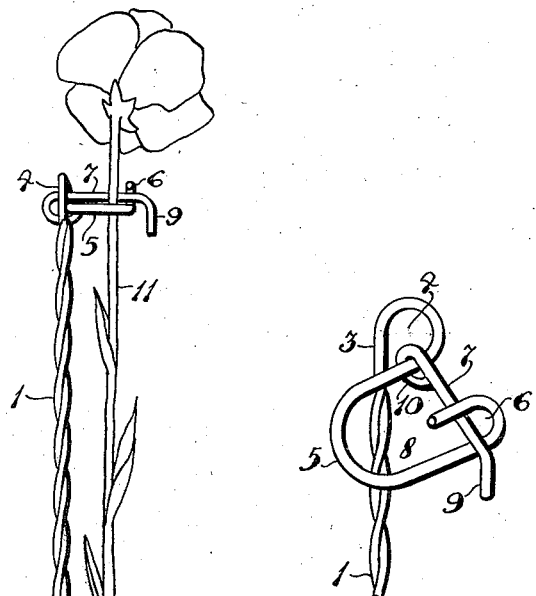
Figure 2 is an enlarged perspective detail illustrating the particular locking means I employ in association with this invention.
Figure 1:
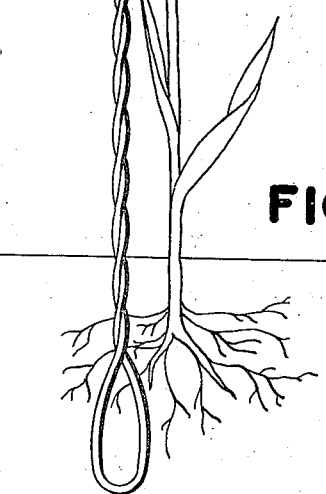
Figure 1 is a side elevation of my combination plant stake and lock shown in situ and supporting a plant.

My invention consists of a stake or standard portion 1 which is preferably, though not necessarily, manufactured of twisted wire, the lower end of which is looped as at 2, while the upper end of one of the strands 3 is turned around downwardly upon itself to form the eye-loop 4. The wire is then turned in a horizontal plane into a U-shaped formation which provides a rigid open collar 5, the collar portion terminating in the retaining element 6 which takes the form of an upwardly and reverse angulated open loop.

The lock-piece 7 for the foregoing, consists of a short wire bar 8 which is preferably downward angulated at the end 9 thereof, the opposite end being looped to form the eyelet 10, and from the foregoing it will be apparent that I have provided a locking assembly by means of which the stem 11 of a plant may very conveniently be engaged and supported while permitting a limited amount of movement but insufficient to cause bruising or damage to the stalk or stem.

Although I have described the locking assembly of Figure 2 as being formed of wire and integral with the stake or standard 1, it is obvious that if desired, the same might be spiked to the upper end of, or at any point medially of the length of a wooden stake for instance. Alternatively, the standard or stake might be formed of a single piece of wire rather than a twisted piece.

Since various modifications can be made in my invention as hereinabove described and many apparently widely different embodiments of same made within the scope of the claim without departing from such spirit and scope, it is intended that all matter contained in the accompanying specification shall be interpreted as illustrative only and not in a limiting sense and I desire only such limitations placed thereon as are specifically expressed in the accompanying claim.

What I claim as my invention is:

A combination plant stake and lock comprising in combination with a wire standard an eye-loop formed from the material of said standard and at the apex thereof, a rigid horizontal wire collar having an opening therein, and also formed of the wire of said standard adjacent said eye-loop, an up-turned open loop at the end of said collar, a wire locking-bar having an eye-loop at the end thereof attachable at the junction of the standard eye-loop and said collar, said locking-bar spanning the opening in said collar and engaging said open loop at the ends thereof after a plant stem has been introduced into said collar.

TERENCE SHERIDAN.

REFERENCES CITED

The following references are of record in the file of this patent:

UNITED STATES PATENTS

| Number | Name | Date |
|---|---|---|
| 1,875,618 | Lenon | Sept. 6, 1932 |
| 1,635,071 | Comstock | July 5, 1927 |
| 1,594,195 | Henderson | July 27, 1926 |
| 1,244,897 | Robinson | Oct. 30, 1917 |
| 1,218,115 | Phillips | Mar. 6, 1917 |